(12) United States Patent
Ueda et al.

(10) Patent No.: US 7,040,871 B2
(45) Date of Patent: May 9, 2006

(54) COMPRESSOR PROVIDED WITH TORQUE LIMITER

(75) Inventors: Motohiko Ueda, Okazaki (JP); Yasuo Tabuchi, Toyoake (JP); Minoru Mera, Kariya (JP); Taku Adaniya, Kariya (JP); Tomoharu Arai, Kariya (JP)

(73) Assignees: Denso Corporation, Kariya (JP); Kabushiki Kaisha Toyota Jidoshokki, Aichi-ken (JP)

( * ) Notice: Subject to any disclaimer, the term of this patent is extended or adjusted under 35 U.S.C. 154(b) by 272 days.

(21) Appl. No.: 10/402,238

(22) Filed: Mar. 31, 2003

(65) Prior Publication Data

US 2003/0211893 A1    Nov. 13, 2003

(30) Foreign Application Priority Data

Apr. 1, 2002  (JP) ............................. 2002-099026
Mar. 25, 2003 (JP) ............................. 2003-083048

(51) Int. Cl.
*F04B 49/00* (2006.01)

(52) U.S. Cl. ................ 417/223; 417/319; 417/374
(58) Field of Classification Search ................ 417/223, 417/319, 374; 192/45, 41 A, 56.5
See application file for complete search history.

(56) References Cited

U.S. PATENT DOCUMENTS 4,635,771 A * 1/1987 Shoji et al. ............... 192/41 A

| 4,725,259 A | | 2/1988 | Miyata |
|---|---|---|---|
| 5,415,258 A | | 5/1995 | Numata |
| 5,579,879 A | | 12/1996 | Hasegawa |
| 6,056,517 A | * | 5/2000 | Obrist et al. ............. 417/319 |
| 6,234,769 B1 | * | 5/2001 | Sakai et al. ............. 417/374 |
| 6,719,538 B1 | * | 4/2004 | Ota et al. ............... 417/223 |
| 2003/0106763 A1 | * | 6/2003 | Kimura et al. ........... 192/56.5 |

FOREIGN PATENT DOCUMENTS

| DE | 19503501 A1 | 8/1996 |
|---|---|---|
| DE | 19738250 A1 | 3/1999 |
| DE | 69514429 T2 | 8/2000 |
| GB | 2229236 A * | 9/1990 |
| JP | A-6-129449 | 5/1994 |
| JP | B2-7-72585 | 8/1995 |
| JP | A-11-30182 | 2/1999 |
| JP | A-2001-317456 | 11/2001 |
| JP | A-2001-349346 | 12/2001 |
| JP | A-2002-106608 | 4/2002 |

* cited by examiner

*Primary Examiner*—Charles G. Freay
(74) *Attorney, Agent, or Firm*—Posz Law Group, PLC (57) ABSTRACT

A compressor provided with a torque limiter constructed such that, in view of possible occurrence of accidental locking of the compressor, in the case where a one-way clutch is used in place of an electromagnetic clutch in order to permit a refrigerant compressor for a vehicle air-conditioning system to be driven by an electric motor instead of an internal combustion engine, when an excessive torque is to be transmitted by the one-way clutch, rollers ride over wedge surfaces and fall into pocket sections, or sprags are reversed to roll-over.

18 Claims, 9 Drawing Sheets

COMPRESSOR PROVIDED WITH TORQUE LIMITER

BACKGROUND OF THE INVENTION

1. Field of the Invention

The present invention relates to a compressor, and more particularly to a compressor that is provided with a torque limiter and is suitable for use as a refrigerant compressor in an air-conditioning system mounted on a vehicle.

2. Description of the Related Art

A refrigerant compressor for an air-conditioning system mounted on a vehicle such as an automobile is rotationally driven, while the vehicle is running, by a vehicle-mounted internal combustion engine which is the main power source for driving the vehicle, but if it is required to operate the air-conditioning system when the internal combustion engine has come to a stop by idling-stop control or the like, the compressor is rotationally driven by an electric motor operated by a battery mounted on the vehicle as an auxiliary power source. Such a compressor that is driven selectively by one of plural power sources is called as a composite-drive type compressor or a hybrid drive type compressor.

A compressor is described in Japanese Unexamined Patent Publication (Kokai) No. 11-30182, in which, in order to eliminate the need of rotational power connecting/disconnecting means such as an electromagnetic clutch commonly used as a power transmission mechanism for driving a rotary refrigerant compressor, a one-way clutch is provided between a pulley which receives the rotational power from an internal combustion engine and a rotation shaft of the compressor such that the one-way clutch acts so as to stop the rotation of the pulley when the internal combustion engine has come to a stop and the compressor is to be rotationally driven by an electric motor. This compressor is kept rotating at all times while the internal combustion engine is being driven even if the air-conditioning system needs not be operated. Thus, when the refrigerant needs not be compressed, an electromagnetic valve provided in the passage connecting a discharge chamber to a suction chamber is opened so that the effective displacement volume is reduced substantially to zero.

Generally, there are other cases where a one-way clutch is used in a power transmission mechanism, as described, for example, in Japanese Examined Patent Publication (Kokoku) No. 07-72585, in which a one-way clutch is provided between a pulley (either the crank shaft pulley or the driven side pulley) and a rotation shaft in order to prevent the reduction of service life of a belt due to the minute variation of rotation speed in a reciprocating internal combustion engine, which leads to the reduction of the driving torque so that the crank shaft pulley is driven rotationally in reverse direction by the driven side pulley and excessive tension is produced in the belt on the trailing side, leading to reduction of the service life of the belt. Also, technical means are disclosed in Japanese Unexamined Patent Publication (Kokai) No. 06-129449, where, in a sprag-type one-way clutch which can be used for the above-described purpose and in which power transmission may be hampered by roll-over, the outer ring of the one-way clutch is hardened to prevent occurrence of the deformation of the outer ring.

When a compressor is constructed in this manner, by using a one-way clutch instead of an electromagnetic clutch, such that the rotation shaft of the compressor is always kept rotating while the internal combustion engine is operated, the torque load acting upon the rotation shaft of the compressor may become excessively large in the event of failure or locking of the compressor and, as a result, the belt between a crank shaft pulley of the internal combustion engine and a pulley on the compressor side may be broken, or the internal combustion engine may come to a stop and the vehicle cannot keep running on, or a torque shock may be produced that gives uncomfortable sensation to the passengers in the vehicle.

In order to resolve these problems associated with a compressor having no electromagnetic clutch, it is necessary to provide a member, as described in Japanese Unexamined Patent Publication (Kokai) No. 2001-317456, which breaks when an excess torque load above a predetermined value is applied, somewhere in the power transmission path from the pulley to the rotation shaft of the compressor. However, this may give rise to another problem such as increase of the number of parts, increase of size due to required additional space for providing such a member around the pulley or the like, or complicated shape being required for parts such as pulley. Moreover, in the prior art as described above, the function of a torque limiter is realized by breakage of a member and, as the timing of the occurrence of breakage of the member fluctuates depending upon various factors such as the surface characteristics of the member, metallography of the material, temperature, and age deterioration, there arises another problem that the member may break during normal operation or the member may not break even if the predetermined torque is exceeded.

SUMMARY OF THE INVENTION

It is therefore an object of the present invention to overcome the above-described problems associated with the prior art and to provide novel means to resolve these problems.

A compressor provided with a torque limiter of the present invention is a rotary compressor which is provided with a power transmission mechanism and is rotationally driven via the power transmission mechanism by an external rotational power source, wherein the power transmission mechanism comprises a one-way clutch section and is constructed such that, as long as the torque load acting upon the compressor is within the range of normal value, the one-way clutch section is in an engaged state so as to transmit the rotational power from the rotational power source to the compressor, while, when the torque load acting upon the compressor increases unusually and exceeds a predetermined value, the one-way clutch section becomes disengaged to shut off the transmission of the rotational power from the rotational power source to the compressor, and once the transmission of the rotational power is shut off, it does not transmit the rotational power again.

Therefore, when the compressor is in normal operation and the torque load acting upon the compressor is within the range of normal value, the one-way clutch is in an engaged state so as to transmit the rotational power efficiently from the rotational power source to the compressor, but when the torque load acting upon the rotation shaft increases unusually due to some cause such as locking of the compressor or the like, the one-way clutch section becomes disengaged so that the transmission of the rotational power from the rotational power source to the compressor is shut off, and the shut-off state is maintained. Thus, the one-way clutch section acts as a torque limiter so that no excessive torque load acts on the rotational power source, and no torque shock occurs and no damage is produced in the rotational power source.

When an auxiliary power source is provided in the power transmission mechanism, the compressor can be rotationally driven by the auxiliary power source in place of the main rotational power source while the one-way clutch section acting as a torque limiter enables the main rotational power source to be maintained in a halted state.

When the one-way clutch section is constructed as a roller type one-way clutch, in addition to forming a first pocket section usually provided in the circumferential direction on one side of the wedge surface on the outer ring or the inner ring engaged with the roller of the one-way clutch section, a second pocket section can be formed on the other side of the wedge surface such that, when the torque load increases unusually and exceeds a predetermined value, the roller may fall into the second pocket to be disengaged from the wedge surface so as to prevent the excessive torque load from giving an adverse effect upon the rotational power source.

When the one-way clutch is constructed as a sprag-type one-way clutch, if the torque load increases unusually and exceeds a predetermined value, the sprags in the one-way clutch section are reversed to a state of roll-over so as to prevent the excessive torque load from giving an adverse effect upon the rotational power source.

When a shock absorbing damper formed of an elastic material is provided in the power transmission path, the shock due to the torque variation can be reduced, and ingress of foreign substance such as dust, water, oil or the like, into the power transmission mechanism, can be avoided by suitable design of the structure of the shock absorbing damper.

The power transmission mechanism for the compressor of the present invention can be largely constructed in the interior of the pulley for receiving the rotational power from the rotational power source. The power transmission mechanism can be thereby formed compactly.

An auxiliary power source that can be provided in the interior of the power transmission mechanism for the compressor is preferably an electric motor operated by an electric power source such as a battery. As an electric motor can be very compact, it can be accommodated in the interior of a pulley.

When a bearing section is provided together with the one-way clutch section used in the power transmission mechanism of the compressor of the present invention, the concentricity of the outer ring and the inner ring of the one-way clutch section can be maintained easily.

The one-way clutch section used in the power transmission mechanism of the compressor of the present invention may be provided outside the housing of the compressor, or may be incorporated inside the housing of the compressor. In the latter case, the lubrication of the one-way clutch section can be carried out jointly by using the lubricant oil circulating in the compressor. Thus, the lubricating system can be simplified and the wear and overheating of the one-way clutch section can be reliably prevented.

DESCRIPTION OF THE PREFERRED EMBODIMENTS

A compressor provided with a torque limiter according to the present invention will be described in detail with reference to FIGS. 1 to 4 showing a first embodiment thereof. The compressor itself is a swash-plate type, a scroll type, a vane type or other displacement compressor, and is constructed such that it can achieve an operating state with a zero displacement volume. However, the feature of the present invention does not consist of the construction of the compressor but of the power transmission mechanism provided in the compressor.

Figure 1:
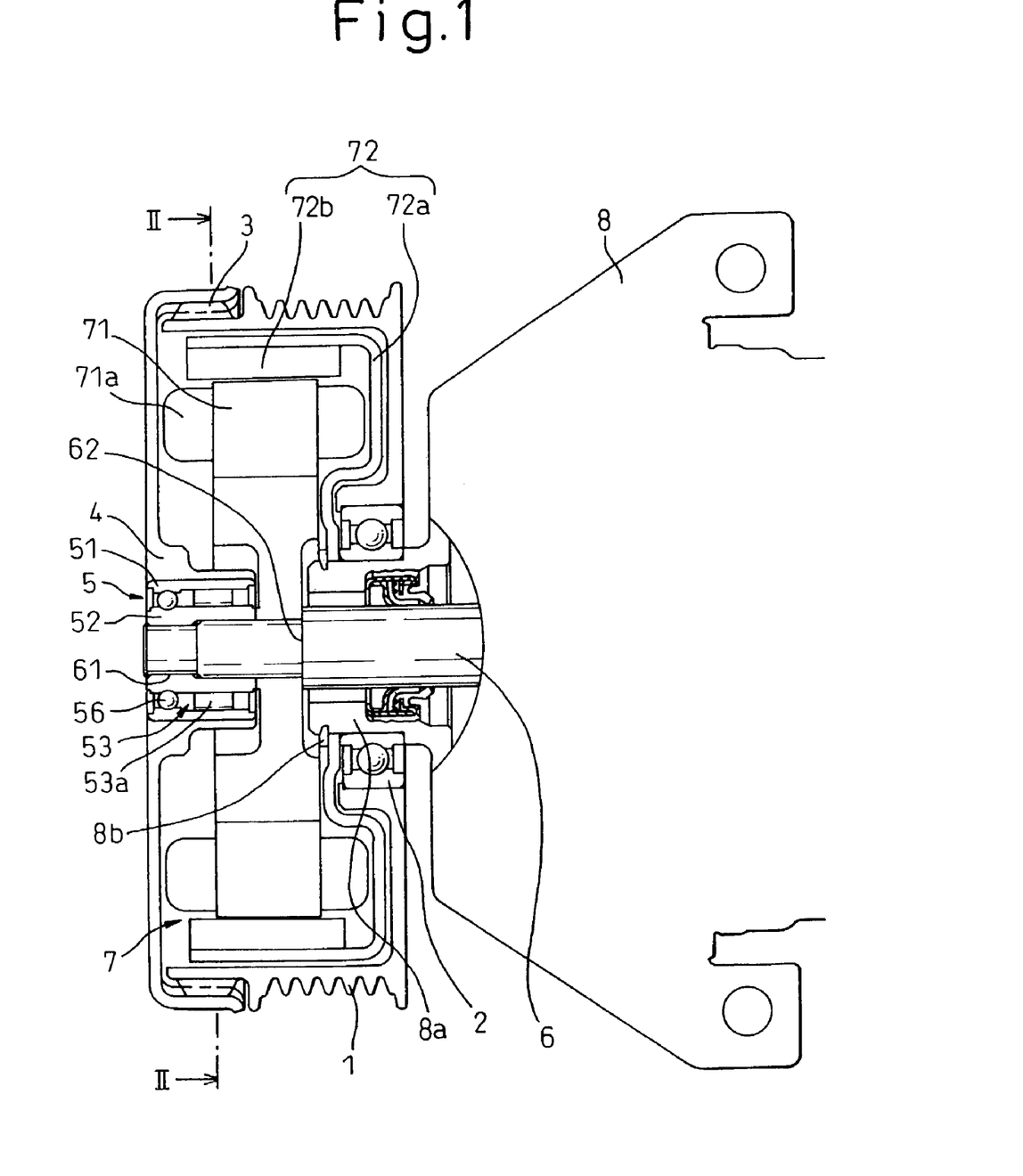
FIG. 1 is a front vertical sectional view showing a compressor according to a first embodiment of the present invention.
Figure 2:
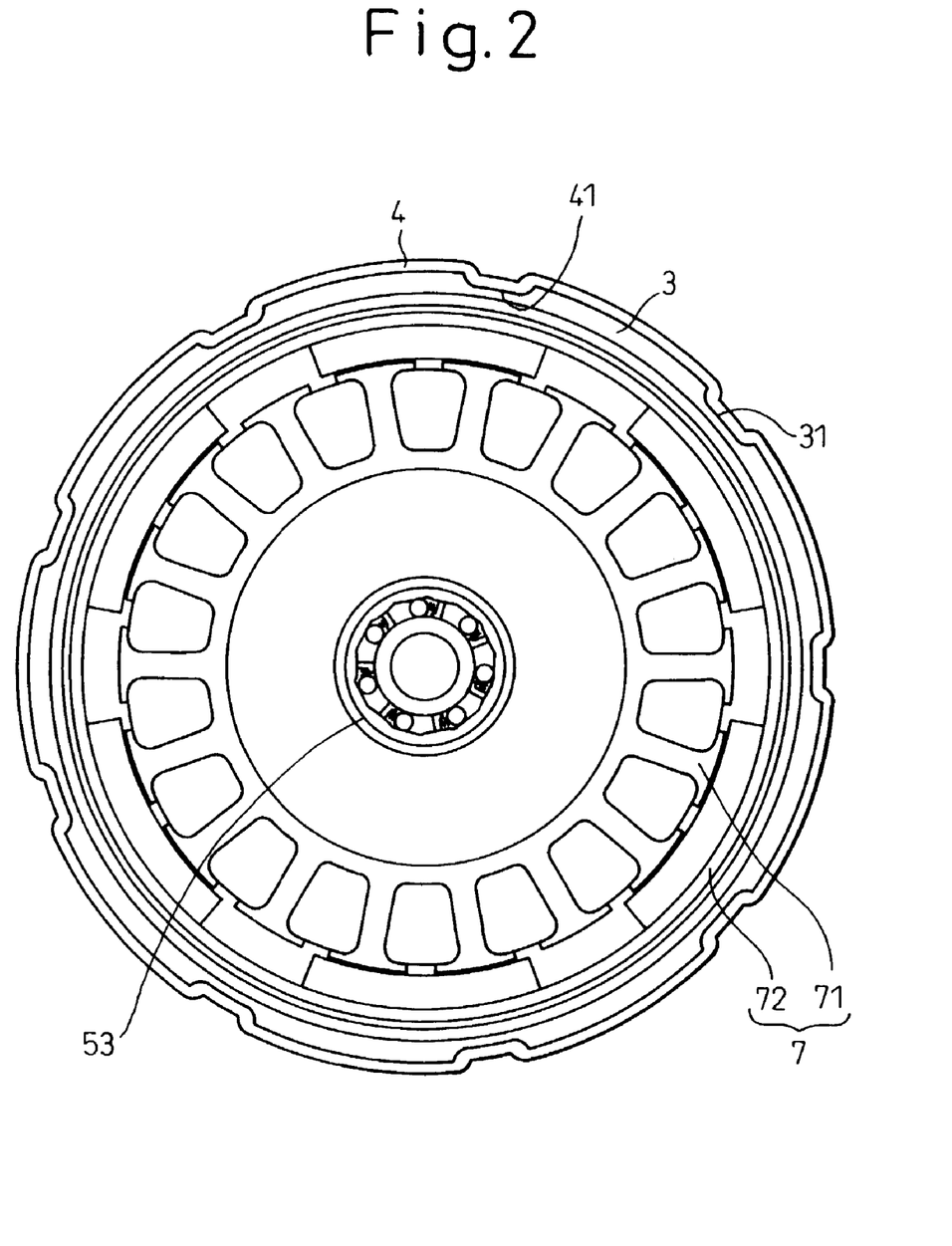
FIG. 2 is a side transverse sectional view taken along the line II—II of FIG. 1.

The power transmission mechanism belongs to the so-called hybrid drive type mechanism. When the compressor is used as a refrigerant compressor in an air-conditioning system mounted on a vehicle, the power transmission mechanism is used to rotationally drive the compressor selectively using either an internal combustion engine (not shown) which is the main power source for driving the vehicle or an electric motor incorporated in the power transmission mechanism itself as an auxiliary power source. In the drawings, reference numeral 1 denotes a pulley for receiving rotational power via a belt from the internal combustion engine (not shown). The pulley 1 is supported via a bearing 2 by a boss section 8a, which projects from a portion of the housing of the compressor 8. Reference numeral 3 denotes a shock-absorbing damper formed of elastic material such as synthetic rubber and which is heat-bonded to the annular outer circumferential surface of the end portion of the pulley 1. As shown in FIG. 2, a plurality of recesses 31 is formed on the outer circumferential surface of the shock absorbing damper 3.

Reference numeral 4 denotes a dish-shaped hub having an opening in a center portion and a plurality of convexities 41 are formed on the outer circumferential portion so as to project inwardly in a radial direction. These convexities 41 are respectively fitted into the recesses 31 of the shock absorbing damper 3. The pulley 1 is engaged with the hub 4 via the shock absorbing damper 3 formed of elastic material so as to transmit the rotational power (torque) elastically to suppress the shock due to the torque variation while preventing water, dust, or the like from entering through a gap into internal space of the pulley 1.

Figure 3:
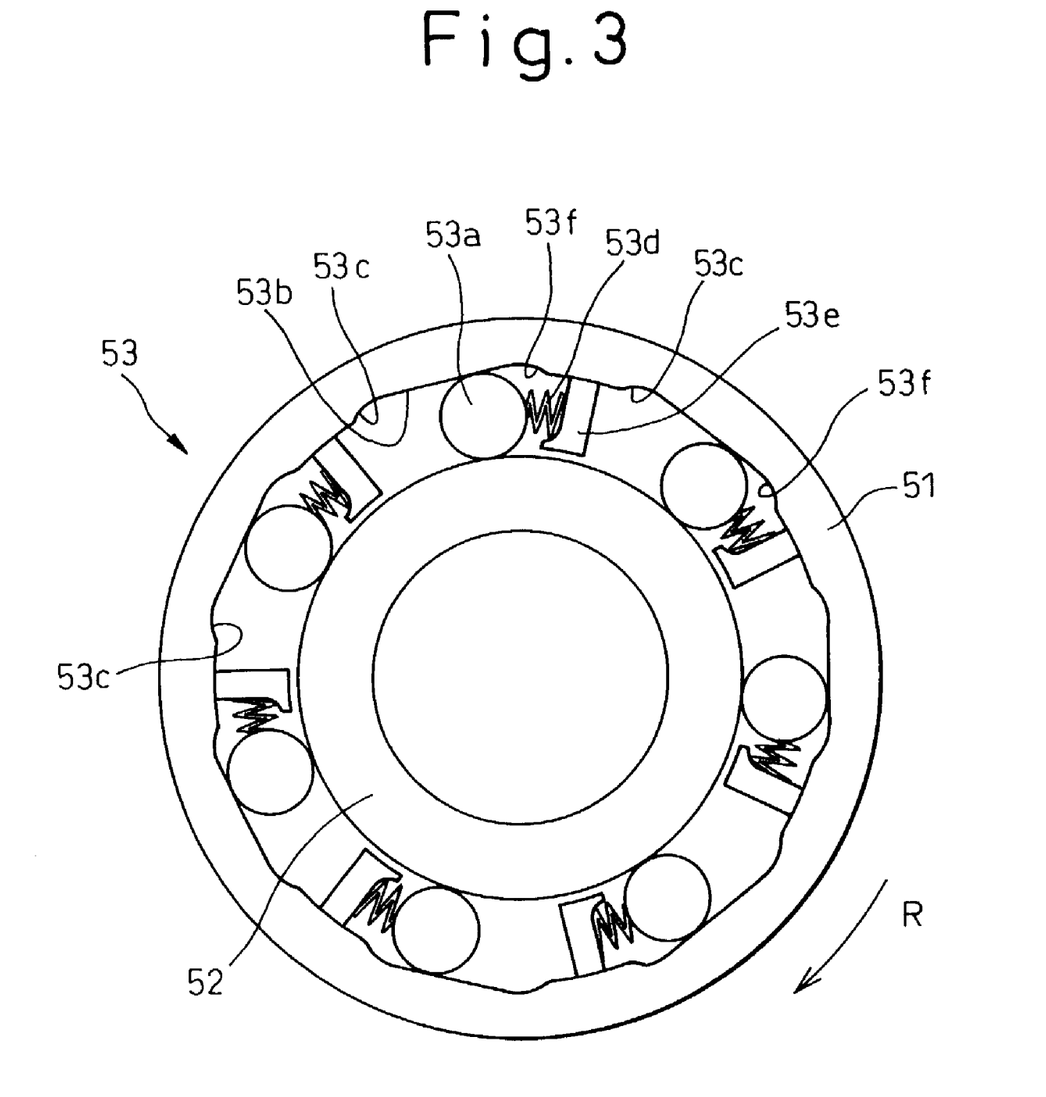
FIG. 3 is an enlarged side transverse sectional view showing an essential part of FIG. 2.

Reference numeral 5 denotes a one-way clutch unit composed of a roller type one-way clutch section 53 and a bearing section 56 such as ball bearings in the case of the first embodiment. The detailed structure of the one-way clutch section 53 is shown in FIG. 3. The one-way clutch section 53 comprises an outer ring 51, an inner ring 52, a plurality of rollers 53a, springs 53d for pushing the respective rollers 53a in the direction opposite to the rotational drive direction R of the compressor 8, and supports 53e attached to the outer ring 51 for supporting the respective springs 53d. The bearing section 56 is provided to maintain the concentricity between the outer ring 51 and the inner ring 52 of the one-way clutch section 53. For this purpose, the outer ring 51 and the inner ring 52 of the one-way clutch section 53 are extended in axial direction so as to form the outer ring and the inner ring of the bearing section 56. The roller 53a may be a spherical ball.

The outer ring 51 has an outer circumferential surface that is fitted into the central opening of the hub 4 so as to form an integral unit. An inner circumferential surface of the outer ring 51 in the one-way clutch section 53 is not a smooth cylindrical surface, but has wedge surfaces 53b exerting a wedge action on the rollers 53a, first pocket sections 53f and second pocket sections 53c respectively before and behind the wedge surfaces 53b in the direction of rotation R formed thereon. The wedge surface 53b is slightly tilted relative to the tangential direction to make an angle of attack in the forward direction with respect to the rotational drive direction R. The wedge surface 53b, and hence the outer ring 51, has suitable magnitude of elasticity, and when the roller 53a is pressed against it with a force not less than a predetermined value, it can deform elastically or plastically to receive the roller 53a. If the wedge surface 53b is formed, for example, as a small plane, and the length of the wedge surface 53b along the circumferential direction of the outer ring 51 is suitably increased, the above-mentioned first pocket section 53f and second pocket section 53c are formed naturally before and behind the wedge surface 53b.

In the one-way clutch section 53 provided in the compressor of the first embodiment, while the wedge surface 53b for the roller 53a and the first pocket section 53f and the second pocket section 53c before and behind the wedge surface 53b are formed on the inner circumferential surface of the outer ring 51, the outer circumferential surface of the inner ring 52 is formed as a smooth cylindrical surface so as to permit free rolling of the roller 53a. Therefore, when the outer ring 51 is moved relative to the inner ring 52 in the same direction as the rotational drive direction R of the compressor 8, the roller 53a is caught like a wedge between the wedge surface 53b of the outer ring 51 and the outer circumferential surface of the inner ring 52 so that they are locked to each other to prevent relative rotation, and as a result, the inner ring 52 and the outer ring 51 rotate as one integral unit.

Figure 4:
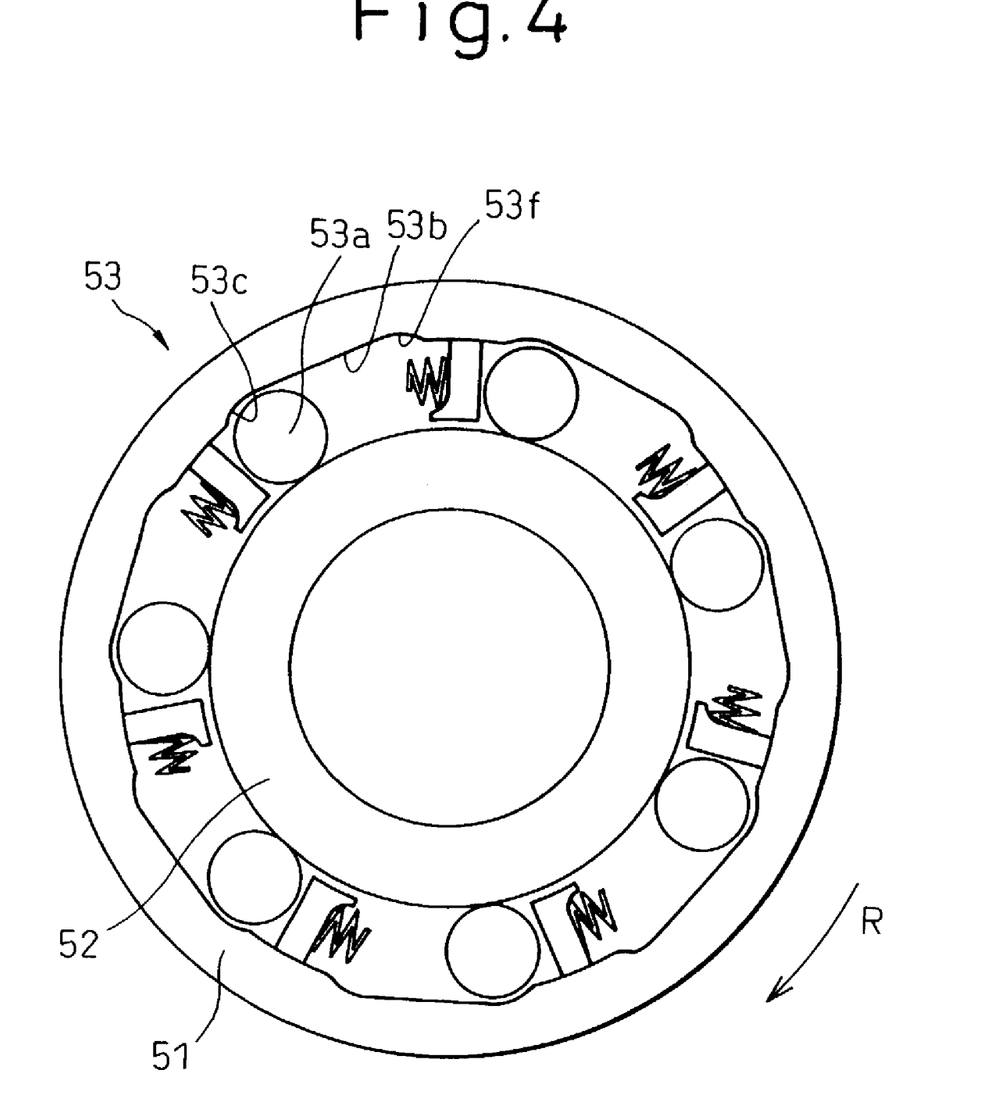
FIG. 4 is a side transverse sectional view showing another operating state of the essential part shown in FIG. 3.

On the other hand, when the outer ring 51 is at rest and the inner ring 52 rotates in the same direction as the rotational drive direction R of the compressor 8, the roller 53a falls into the first pocket section 53f. Also, when the outer ring 51 is moved relative to the inner ring 52 in the same direction as the rotational drive direction R, the roller 53a is initially engaged with the wedge surface 53b so as to relatively lock the outer ring 51 to the inner ring 52 so that the inner ring 52 rotates with the outer ring 51 in the direction R. However, when a torque load at or above a predetermined value acts upon the inner ring 52 and the outer ring 51 is rotated against this torque, the wedge surface 53b is deformed elastically or plastically so that the roller 53a falls into the second pocket section 53c. In these pocket sections 53f, 53c, the separation from the outer circumferential surface of the inner ring 52 is larger than the diameter of the roller 53a, so that the roller 53a can no longer lock the outer ring 51 and the inner ring 52 relative to each other and, therefore, rotational power is not be transmitted from one of the outer ring 51 and the inner ring 52 to the other. Thus, the inner ring 52 and the outer ring 51 can rotate freely relative to each other.

The inner circumferential surface of the inner ring 52 of the one-way clutch unit 5 comprises a cylindrical surface which is fitted to the rotation shaft 6 of the compressor 8, and a female screw section to be threaded to a male screw section 61 formed on the end portion of the rotation shaft 6, which together connect the inner ring 52 to the rotation shaft 6 to form an integral unit.

Reference numeral 7 denotes an electric motor which is constructed inside the pulley 1, and which comprises a rotor 71 attached to the rotation shaft 6 of the compressor 8, and a stator 72 attached to the boss section 8a projecting in axial direction from the housing of the compressor 8. In the embodiment shown, the rotor 71 is fitted via the center opening to the rotation shaft 6, and is sandwiched and fixed between the step 62 of the rotation shaft 6 and the inner ring 52 of the one-way clutch unit 5. The rotor 71 can thus rotate together with the rotation shaft 6. A plurality of windings 71a are provided on the rotor 71, and these windings are connected to an external power supply line via a plurality of slip rings or commutators (not shown) attached to the rotor 71, and a plurality of brushes or the like attached to the housing side so as to be slidably engaged with them.

The stator 72 comprises a dish-shaped stator bracket 72a attached at the center opening to the boss section 8a of the housing using a snap ring 8b, and a plurality of magnets (permanent magnets) 72b attached evenly to the inner surface of the peripheral portion so as to be opposed to the outer circumferential surface of the rotor 71. Although, in the embodiment shown, a magnet type motor with relatively small power consumption is used as the electric motor 7, a magnet type motor need not necessarily be used as the electric motor 7 of the present invention, and another type of electric motor may be used.

The operation of the power transmission mechanism that is provided in the compressor of the first embodiment will be described below. While the internal combustion engine (not shown) of the vehicle is operating, the pulley 1 is driven, via a belt, by a crank pulley on the internal combustion engine. Rotation of the pulley 1 is transmitted via the shock absorbing damper 3 to the hub 4, whereby, in the one-way clutch section 53 of the one-way clutch unit 5, the outer ring 51 in one integral unit with the hub 4 rotates so as to rotationally drive the inner ring 52 united in one integral unit with the rotation shaft 6 of the compressor 8 in the same direction as the rotational drive direction R of the compressor 8, so that the roller 53a is brought into engagement with the wedge surface 53b of the outer ring 51 and the outer ring 51 and the inner ring 52 are locked relative to each other. Thus, the rotation of the hub 4 is transmitted to the rotation shaft 6 of the compressor 8, and the compressor 8 is thereby rotationally driven so as to suck the refrigerant and compress and discharge it to the refrigeration cycle.

If the compressor 8 is of variable displacement type, the air-conditioning system can be made substantially inoperative by reducing the displacement volume to zero even if the internal combustion engine is operating and the pulley 1 is being rotated. Therefore, a power transmission mechanism such as an electromagnetic clutch commonly used in the rotation shaft 6 need not be provided. Needless to say, the cooling capability of the air-conditioning system can be controlled freely by varying the displacement volume of the compressor 8 arbitrarily.

When the air-conditioning system is to be operated, for example, in the event of idling-stop control being performed so that the internal combustion engine as the main power source has come to stop, and the pulley 1 and hub 4 as well as the outer ring 51 of the one-way clutch unit 5 have come to stop simultaneously with the internal combustion engine, electric power is supplied to the electric motor 7 from a power source such as a battery to rotate the rotor 71 so that the rotation shaft 6 of the compressor 8 attached to the rotor 71 is rotationally driven. Power supply to the electric motor 7 is automatically controlled by an electronic controller or the like (not shown). When the compressor is rotationally driven by an auxiliary power source such as an electric motor 7, the compressor can suck the refrigerant and compress and discharge it to refrigeration cycle in the same manner as when driven by an internal combustion engine. Even if the compressor is not of variable displacement type, the shut-down of the air-conditioning system or the control of the cooling capability can be freely performed by stopping the power supply to the electric motor 7 or by controlling the amount of power supply or varying the rotational speed of the rotation shaft 6.

When the electric motor 7 is being operated in this manner, the inner ring 52 is rotated relative to the outer ring 51 at rest in the same direction as the rotational drive direction R of the compressor 8 in the one-way clutch section 53 of the one-way clutch unit 5, so that the roller 53a compresses the spring 53d to fall into the first pocket section 53f. As a result, the roller 53a does not come into engagement with the wedge surface 53b, and the inner ring 52 can rotate freely relative to the outer ring 51. Thus, the one-way clutch section 53 is brought into an ordinary disengaged state, and the torque produced by the electric motor 7 is not consumed wastefully.

While the refrigerant compressor 8 of the air-conditioning system is driven by the internal combustion engine as the main power source, if the torque load acting on the rotation shaft 6 happens to increase unusually due to some cause such as locking of the compressor 8, there is the possibility that the belt on the pulley 1 may be broken, or the rotational speed of the internal combustion engine may suddenly drop so as to give shock to the occupants of the vehicle. However, with the power transmission mechanism provided in the compressor of the first embodiment, such problems can be avoided because the one-way clutch section 53 automatically passes from the normal engagement state as shown in FIG. 3 to the disengaged state as shown in FIG. 4.

Thus, in such a case, when the inner ring 52 is being brought to a halt due to the unusually increased torque, the pressing force of the roller 53 against the wedge surface 53b of the outer ring 51 becomes unusually large and the wedge surface 53b deforms elastically or plastically to receive the roller 53a. As a result, the roller 53a rides over the wedge surface 53b and falls into the second pocket section 53c. This produces space around the roller 53a so that the outer ring 51 can rotate freely with the internal combustion engine and the pulley 1, even if the inner ring 52 has come to a stop, and the above-mentioned problems can be thereby avoided. Thus, with the power transmission mechanism provided in the compressor of the first embodiment, the one-way clutch section 53 may take on a special disengaged state such that the power transmission to the compressor 8 can be shut off while the pulley 1 is rotating.

When the internal combustion engine as the main power source comes to a halt and the compressor 8 is being operated by the electric motor 7 as an auxiliary power source, if the compressor 8 is locked, an unusually large current flows in the electric motor 7 in accordance with the abnormally increasing torque load. Thus, by shutting off the power supply when this unusual current is detected, an occurrence of any inconvenience can be prevented. In this case, the roller 53a of the one-way clutch section 53 falls into the first pocket section 53f of the outer ring 51 to produce an ordinary disengaged state so that the outer ring 51 and the hub 4, and the pulley 1 interconnected therewith, as well as the belt and the internal combustion engine, are not adversely affected.

In the above-described state, if the operation of the internal combustion engine is resumed, as with the above-described case, the roller 53a of the one-way clutch section 53 rides over the wedge surface 53b to fall into the second pocket section 53c so that, even if the compressor 8 is locked, the outer ring 51 of the one-way clutch section 53 can rotate freely and an adverse effect upon the internal combustion engine or the occurrence of problems such as breakage of the belt can be avoided.

Thus, with the power transmission mechanism provided on the compressor of the first embodiment, a function of a torque limiter can be given to the one-way clutch unit 5 itself without giving rise to any special problems such as an increase in the number of parts, or an increase in the size of the unit. Also, in this case, the function as a torque limiter does not produce results such as breakage of a member that is difficult to recover. When the outer ring is elastically deformed, there is no trace left on the wedge surface 53b, and even when the outer ring is plastically deformed, only a slight streak of the roller 53a is left on the wedge surface 53b. Thus, the repair can be accomplished only by replacement of the one-way clutch unit 5. Therefore, stable power shut-off characteristics can be obtained with the one-way clutch unit 5 without producing adverse effects upon other parts.

In general, when the compressor is of variable displacement type, and is in idling mode with zero displacement, an unusual sound may be sometimes produced by the oscillation of the pulley 1 or of the parts in the inside of the compressor 8 under the influence of the torque variation of the power source such as the internal combustion engine. This is because, with zero displacement, the torque acting upon the rotation shaft 6 of the compressor 8 oscillates about zero with a certain amplitude. If the one-way clutch unit 5 is provided in a portion of the power transmission mechanism of the compressor 8 as in the first embodiment, the negative component of the torque is not transmitted to the inside of the compressor 8, and as a result, parts in the compressor 8 do not oscillate and a noise produced near the compressor 8 can be prevented.

Figure 5:
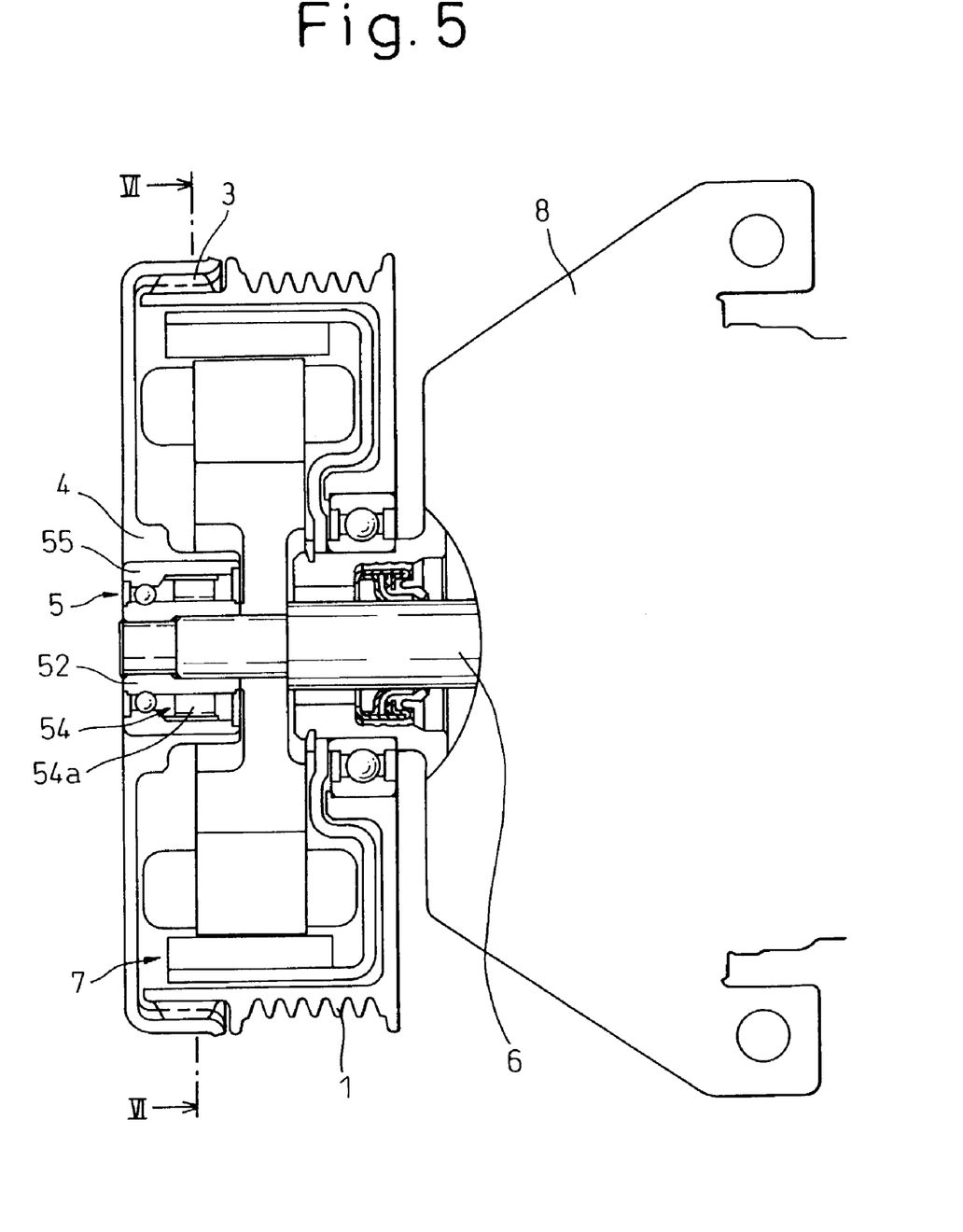
FIG. 5 is a front vertical sectional view showing a compressor according to a second embodiment of the present invention.
Figure 6:
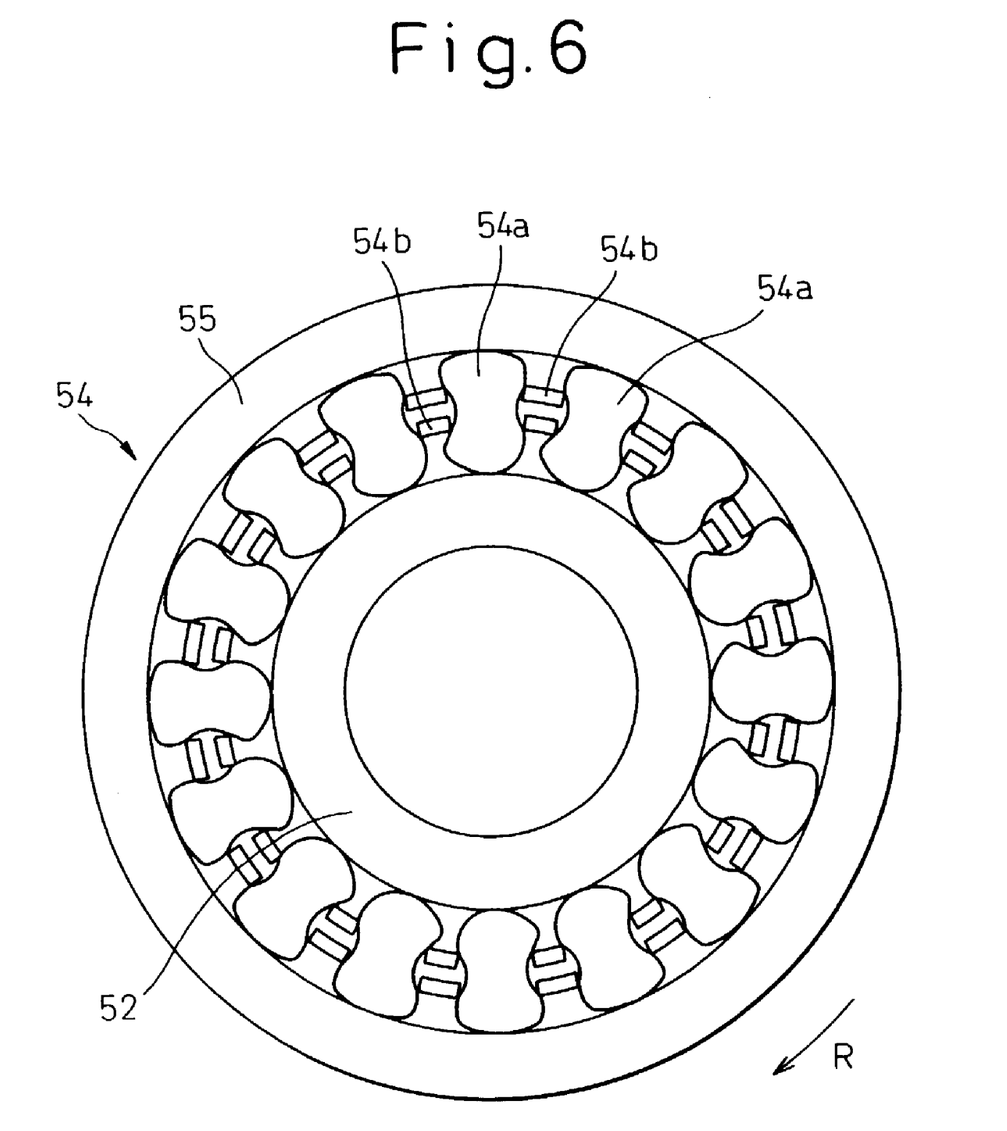
FIG. 6 is a side transverse sectional view taken along the line VI—VI of FIG. 5 and showing an essential part of the second embodiment.
Figure 7:
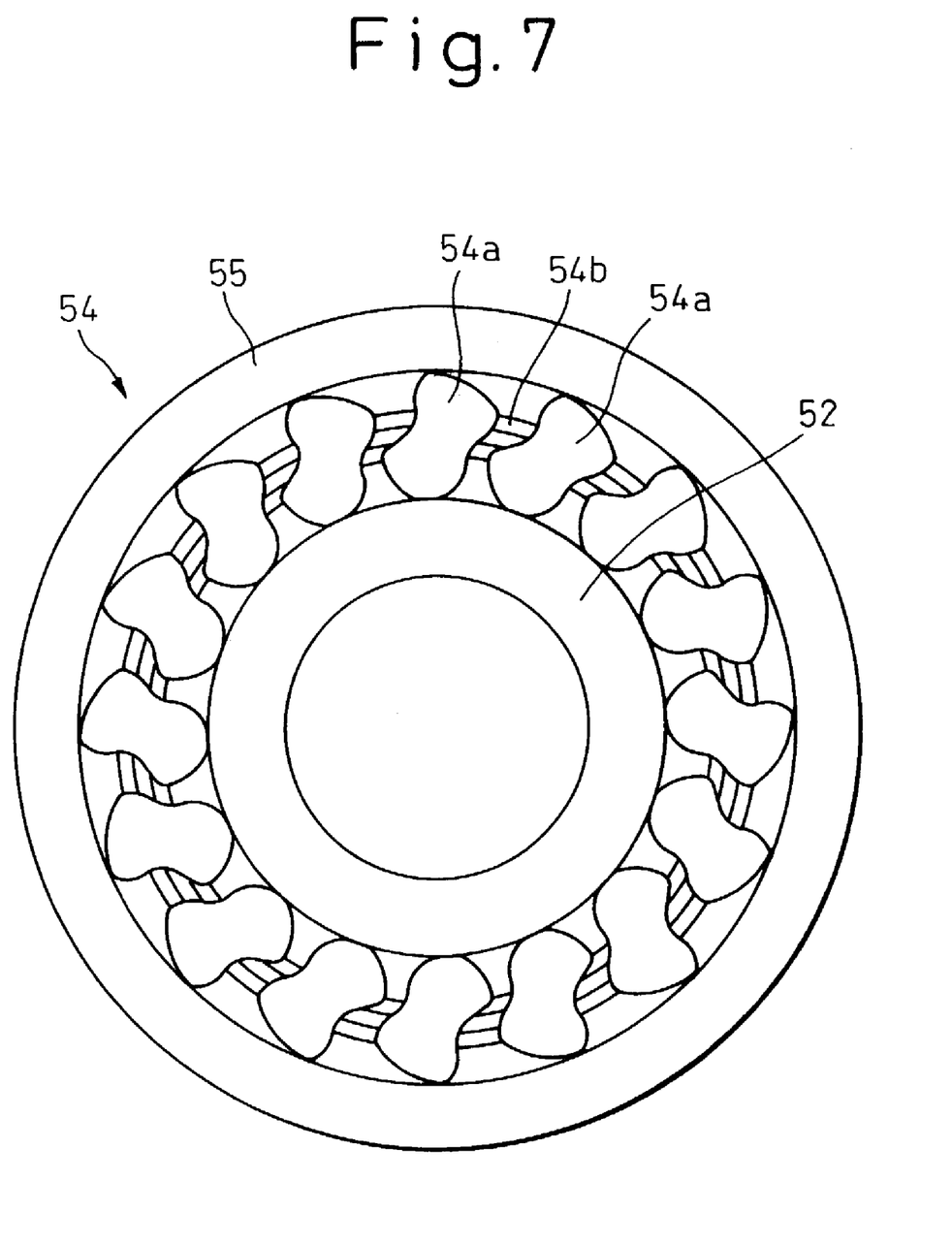
FIG. 7 is a side transverse sectional view showing another operating state of the essential part shown in FIG. 6.

FIGS. 5 to 7 are views showing a compressor provided with a torque limiter according to a second embodiment of the present invention. In the above-described first embodiment, the one-way clutch section 53 including the wedge surface 53b and the roller 53a is used in the one-way clutch unit 5 which constitutes a part of the power transmission mechanism provided on the compressor. In the second embodiment, a so-called sprag type one-way clutch section 54 is used in place of the above-described roller type one-way clutch section 53. As is evident from FIG. 6 showing the state of engagement, this one-way clutch section 54 comprises an outer ring 55 having a smooth inner circumferential surface as in an ordinary sprag type one-way clutch, an inner ring 52 having a smooth outer circumferential surface, a multiplicity of sprags 54a inserted therebetween, and springs 54b serving as retainers for maintaining the relative positional relationship and orientation of the multiplicity of sprags 54a.

The sprag type one-way clutch section 54 is intentionally set such that, when a torque equal to or greater than 2 to 3 times the rated torque is applied to it, the sprag 54a is reversed beyond the state of engagement of the inner ring 52 with the outer ring 55, to the so-called "roll-over" state in which torque is no longer transmitted.

As is evident from comparison of FIG. 5 with FIG. 1, the construction of the compressor in the second embodiment is substantially the same as the construction in the first embodiment, except for the one-way clutch unit 5 in the power transmission mechanism. As in the first embodiment, the compressor in the second embodiment is also provided with a drive mechanism that belongs to the so-called hybrid type drive mechanism. Thus, the compressor 8 in the second embodiment is also provided with a pulley 1, a shock absorbing damper 3, a hub 4, an electric motor 7, and the like, and therefore can be used as a hybrid drive type refrigerant compressor for an air-conditioning system.

Thus, in accordance with the compressor in the second embodiment, when an internal combustion engine as the main power source is being operated and the compressor 8 is being rotationally driven by the internal combustion engine in the direction R, the sprag type one-way clutch section 54 is in the normal engagement state as shown in FIG. 6 so as to transmit the torque, and when the internal combustion engine has come to a stop and the compressor 8 is rotationally driven by an electric motor 7 in the direction R, the sprag 54a is slightly tilted so as to bring the one-way clutch section 54 into disengaged state so that, even if the inner ring 52 and the rotation shaft 6 are rotated by the electric motor 7, the outer ring 55, together with the pulley 1 and the hub 4, can remain at rest.

In the event where the compressor 8 happens to be locked, the sprag 54a of the sprag type one-way clutch section 54 is reversed by an unusually increased torque load to the state of roll-over so that the power transmission from the outer ring 55 to the inner ring 52 is shut off and other portion is thus prevented from being adversely affected. In this way, the sprag type one-way clutch section 54 used in the one-way clutch unit 5 acts as a torque limiter, and substantially the same operative effect as in the first embodiment can be obtained with the compressor in the second embodiment.

Figure 8:
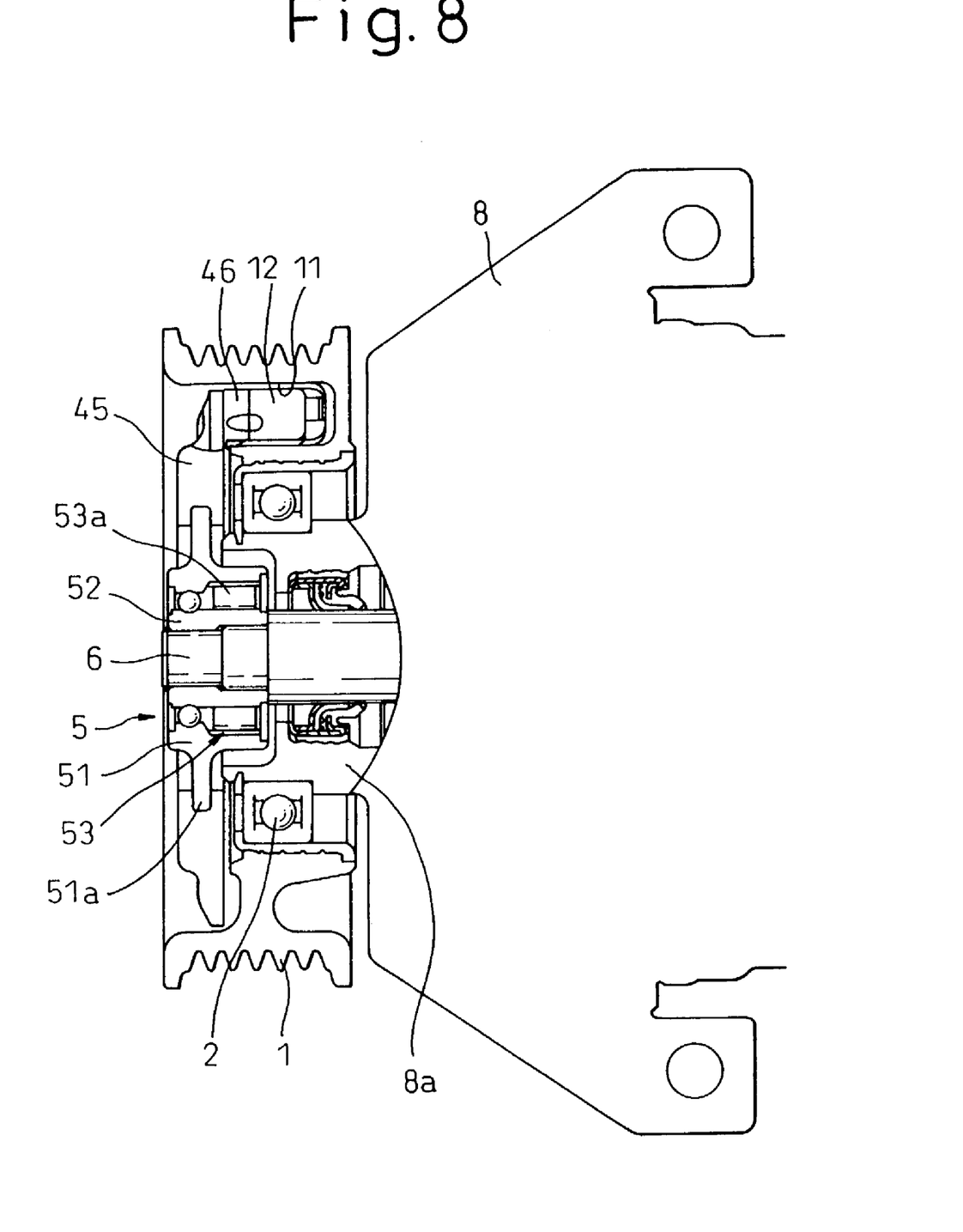
FIG. 8 is a front vertical sectional view showing a compressor according to a third embodiment of the present invention.

FIG. 8 is a view showing a compressor provided with a torque limiter according to a third embodiment of the present invention. The power transmission mechanism provided on the compressor of the third embodiment is not the so-called hybrid type drive mechanism, and does not include a built-in auxiliary power source such as an electric motor 7 as in the above-described first and second embodiments. The compressor 8 has a simple construction without a structurally complicated and expensive power connecting/disconnecting means such as an electromagnetic clutch. Thus, for example, a variable displacement compressor that can be used with zero displacement is used as the compressor 8. In particular, it is required that the power transmission mechanism provided on the compressor of the third embodiment should have the function of a torque limiter.

As the compressor of the third embodiment is not provided with a hybrid drive mechanism, it is constructed, schematically, such that an electric motor 7 as an auxiliary power source is omitted from the power transmission mechanism of the compressor of the first embodiment as shown in FIG. 1, or from the power transmission mechanism of the compressor of the second embodiment as shown in FIG. 5. More specifically, the compressor is constructed such that a pulley 1 for receiving rotational power from a power source such as an internal combustion engine has a plurality of recesses 11 in axial direction formed thereon which are evenly disposed around the rotation shaft 6 of the compressor 8, and block-shaped rubber-like elastic bodies 12 respectively disposed in these recesses 11.

As in the compressor 8 in the first embodiment, an inner ring 52 of a one-way clutch unit 5 is attached to the rotation shaft 6 in the compressor 8 of the third embodiment, and a disc-shaped flange section 51a is formed on a corresponding outer ring 51 with a disc 45 of synthetic resin integrally formed with the flange section 51a in one unit. A plurality of claws 46 project from the periphery of the disc 45, and are engaged behind the above-mentioned elastic bodies 12 in the circumferential direction of the pulley 1 relative to the rotational drive direction R of the compressor 8. The elastic bodies thereby act in the similar manner as the shock absorbing damper 3 in the above-described embodiments.

A one-way clutch section 53 comprising rollers 53a similar to that in the first embodiment is formed between the outer ring 51 and the inner ring 52 of the one-way clutch unit 5. The one-way clutch section 53 may be replaced by a sprag type one-way clutch section 54 similar to that in the second embodiment. Other structural parts, such as the main bearing 2, may be similar to those in the above-described embodiments.

In the compressor of the third embodiment, a structural component similar to the one-way clutch section 53 or 54 in those of the first or the second embodiment acts as a torque limiter. Thus, in the event where the torque acting upon the rotation shaft 6 happens to increase unusually due to some cause such as locking of the compressor 8, the roller 53a falls into the second pocket section 53c formed on the inner circumferential surface of the outer ring 51 (see FIG. 3) so that the one-way clutch section 53 becomes disengaged and the transmission of the torque from the pulley 1 to the rotation shaft 6 is shut off. Therefore, the same operative effect can be obtained with the compressor of the third embodiment with its one-way clutch unit 5 and the elastic bodies 12 and the like, as a part of the operative effect obtained in the first and the second embodiments.

Figure 9:
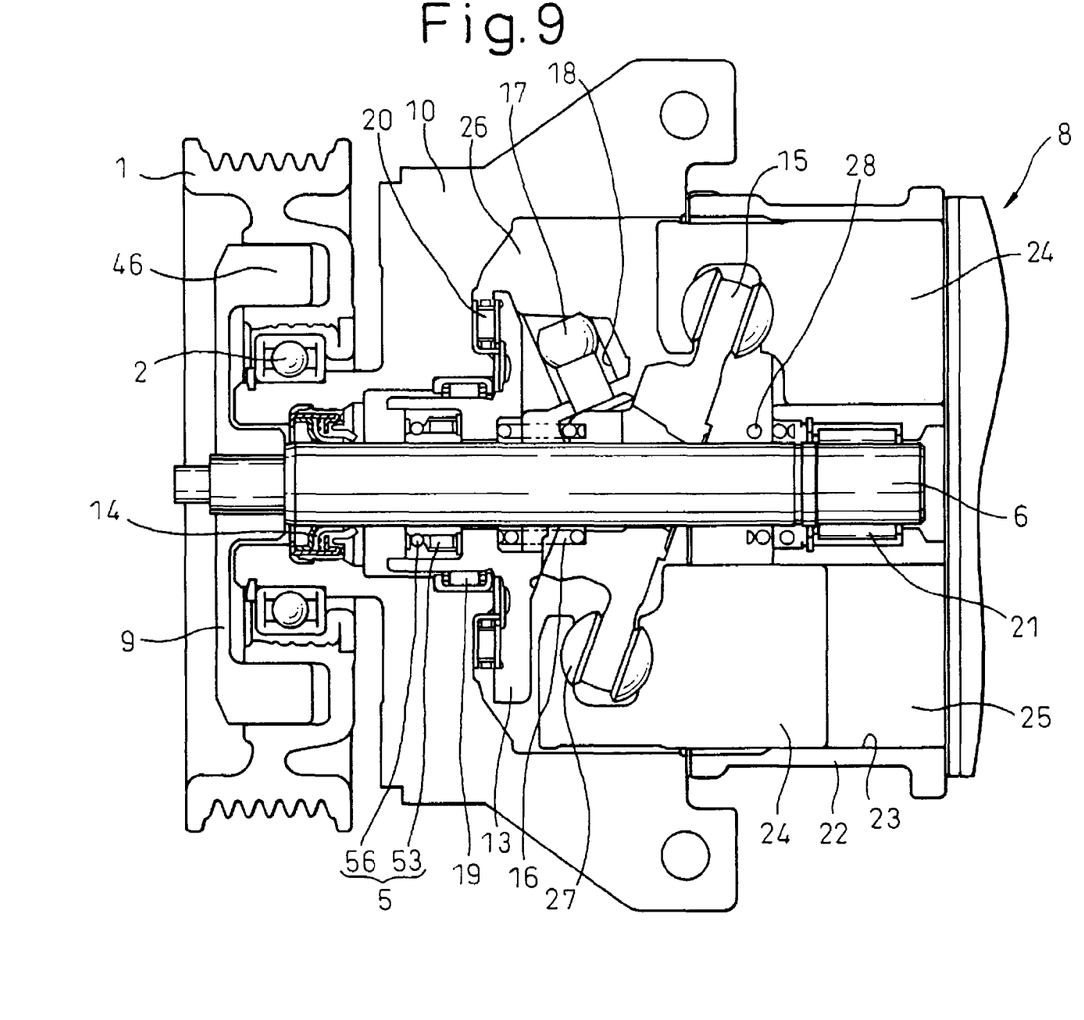
FIG. 9 is a front vertical sectional view showing a compressor according to a fourth embodiment of the present invention.

FIG. 9 is a view showing a compressor according to a fourth embodiment of the present invention. This fourth embodiment is characterized in that a one-way clutch unit 5 consisting of a one-way clutch section 53 having above-described construction and a bearing section 56 is included as a built-in unit inside the housing 10 of the compressor 8. Therefore, the interior of the pulley 1 is simpler than the interior of the pulley 1 in the third embodiment. Again, an electric motor 7 such as that in the first or the second embodiment is not constructed in the interior of the pulley 1, but it is possible to include an electric motor 7. A disc 9 is directly attached to the end portion of the rotation shaft 6, and a plurality of claws 46 similar to those in the third embodiment project in axial direction from the periphery of the disc 9, and are engaged with recesses of the pulley 1 with unshown elastic bodies interposed therebetween. The elastic bodies thereby act in the same manner as the shock absorbing damper 3 in the first embodiment. The compressor may be constructed without providing these elastic bodies such that claws 46 are directly engaged with the recesses of the pulley 1.

The compressor 8 used in the fourth embodiment is a swash-plate type variable displacement compressor that permits operation in idling state with zero displacement. In this case, the rotation shaft 6 is not directly connected to to drive plate 13, and a one-way clutch unit 5 consisting of a one-way clutch section 53 and a bearing section 56 as described above is provided therebetween. The one-way clutch section 53 is similar to that in the first embodiment, and maybe replaced by the sprag type one-way clutch section 54 as in the second embodiment. The one-way clutch unit 5 is disposed further into the inner space of the compressor 8 than the shaft seal device 14, such as a lip seal, that is provided at the portion where the rotation shaft 6 penetrates the housing 10 of the compressor 8. As other features of the structure and the operation of a swash-plate type compressor 8 are well known, only a brief description will be given here.

Inside the housing 10, a generally disc-shaped swash-plate 15 is inserted to the rotation shaft 6 so as to be freely tilted by means of the center hole. A compression spring 16 is also inserted to the rotation shaft 6 such that the one end is supported by the drive plate 13 while the other end of the spring 16 always biases the swash-plate 15 in axial direction and to the right in FIG. 9. An arm 17 is formed so as to project radially from a part of the swash-plate 15, and its front end is slidably engaged with a radial guide groove 18 formed in the above-mentioned drive plate 13. Reference numeral 19 denotes a radial bearing, which bears the boss section of the drive plate 13 as well as one end of the rotation shaft 6 via the aforementioned bearing section 56. Reference numeral 20 denotes a thrust bearing which supports the axial force transmitted from the swash-plate 15 to the drive plate 13 in conjunction with the housing 10. The other end of the rotation shaft 6 is supported, via a radial bearing 21, by the center portion of the cylinder block 22 formed integrally in one unit with the housing 10.

The cylinder block 22 forming a part of the housing 10 has several (for example, five) cylinder bores 23 formed evenly around the rotation shaft 6. A piston 24 is slidably inserted in each of the cylinder bores 23, and an operating chamber 25 is thereby formed for sucking and compressing fluid such as refrigerant in the interior of the cylinder bore 23. Remaining space in the housing 10 forms a swash-plate chamber 26. A shoe 27 formed of material having high slidability and high wear resistance is supported at one end of each piston 24, and each piston 24 is slidably engaged via the shoe 27 with periphery of the swash-plate 15. A part of a fluid (refrigerant) is supplied to the swash-plate chamber at an optional pressure between the discharge pressure and the suction pressure of the compressor 8 via a pressure control valve (not shown). In FIG. 9, a spring 28 which has its right end supported by the portion of the cylinder block 22 on the side of the radial bearing 21, is provided on the rotation shaft 6 as shown in a position close to the radial bearing 21.

The swash-plate type variable displacement compressor 8 of the fourth embodiment is constructed as described above. Thus, when the pulley 1 is rotationally driven via a belt by a power source such as an internal combustion engine of a vehicle (not shown), the power is directly transmitted from the disc 9 having claws 46 to the rotation shaft 6. The power is transmitted from the rotation shaft 6 to the drive plate 13 via the one-way clutch section 53 of the one-way clutch unit 5, wherein the one-way clutch unit 5 acts generally in the same manner as that in the third embodiment.

As the drive plate 13 rotates, the swash-plate 15 is thereby rotationally driven via the guide groove 18 and the arm 17. When the swash-plate 15 is even slightly tilted relative to a fictitious plane perpendicular to the rotation shaft 6, each piston 24 is forced to move in a reciprocating motion in the cylinder bore 23 by the rotation of the swash-plate 15. The operating chamber 25 is thereby expanded or shrunk, so that fluid such as the refrigerant is sucked into the operating chamber 25 via a suction valve (not shown) in the suction stroke when the operating chamber is expanding, and the fluid is compressed in the compression stroke when the operating chamber 25 is shrinking and then the fluid is discharged to the discharge chamber (not shown). Thus, by compressing the fluid in the several operating chambers 25 which are in the compression stroke, a reaction to the compression acts upon the pistons 24 forming the operating chambers 25 so that this reaction to the compression produces a thrusting force that pushes the swash-plate 15 in axial direction (to the left in FIG. 9) against the biasing force of the spring 16.

As described before, an optional control pressure between the discharge pressure and the suction pressure is applied to the swash-plate chamber 26 by the pressure control valve (not shown), so that this control pressure acts as the back pressure upon all the pistons 24 to bias each piston 24 in the direction toward the right in FIG. 9. Therefore, the axial position of the central portion of the swash-plate 15 on the rotation shaft 6 is determined by the balance of the resultant force of the reaction to compression acting upon the piston 24 in at least a part of the operating chambers 25 and the resultant force of the back pressure acting in the swash-plate chamber 26, that is, the axial biasing force due to the control pressure and the biasing force of the spring 16. When the axial position of the swash-plate 15 is determined, the tilt angle of the swash-plate 15, and hence, the amount of stroke of the reciprocating motion that is equal for all the pistons is determined. Therefore, the displacement volume of the compressor 8 can be continuously varied by varying the control pressure of the swash-plate chamber 26 using the pressure control valve.

When the control pressure in the swash-plate 26 is maximized (the discharge pressure is supplied as it is), all the pistons 24 are pressed to the top dead point reducing the stroke to zero and the swash-plate 15 becomes perpendicular to the rotation shaft 6 (the tilt angle is zero in this case). Thus, rotation of the swash-plate 15 does not give rise to reciprocating motion, and the substantial displacement of the compressor 8 becomes zero. Since no reaction to compression is produced in this state, a spring 28 that is free at one end is provided on the rotation shaft 6 so as to produce axial force to give the swash-plate 15 a minimum tilt angle by pushing back the center portion of the swash-plate 15 toward the left in FIG. 9 when the control pressure in the swash-plate chamber 26 is slightly lowered.

When the control pressure in the swash-plate chamber 26 is maximized (the discharge pressure is supplied as it is), all the pistons 24 are pressed to the top dead point reducing the stroke to zero and the swash-plate 15 becomes perpendicular to the rotation shaft 6 (the tilt angle Is zero in this case). Thus, rotation of the swash-plato 15 does not give rise to reciprocating motion, and the substantial displacement of the compressor 8 becomes zero. Since no reaction to compression is produced in this state, a spring 28 that is free at one end is provided on the rotation shaft 6 so as to produce axial force to give the swash-plate 15 a minimum tilt angle by pushing back the center portion of the swash-plate 15 toward the left in FIG. 9 when the control pressure in the swash-plate chamber 26 is slightly lowered.

In the compressor 8 of the fourth embodiment, a one-way clutch unit 5 is provided between the rotation shaft 6 and the drive plate 13, and when the rotation shaft 6 is rotationally driven via the pulley 1 or the like by a power source such as an internal combustion engine in the drive direction of the compressor 8, the one-way clutch section 53 is in engaged state to transmit the power to the drive plate 13 and to rotate the swash-plate 15. Thus, when the pulley 1 is rotating, the drive plate 13 and the swash-plate 15 are always rotating. If the air-conditioning system need not be operated, the control pressure of the swash-plate chamber 26 is maximized to bring the tilt angle of the swash-plate 15 to zero and the reciprocating motion of the pistons 24 is stopped. Therefore, the compressor 8 is in an idling state and consumes little power in this case, so that an electromagnetic clutch or the like needs not be provided between the pulley 1 and the rotation shaft 6 to shut off the power transmission.

When, due to some cause such as locking of the compressor 8, the torque transmitted from the rotation shaft 6 to the drive plate 13 reaches an excessively large value, the one-way clutch section 53 becomes disengaged as described before so as to protect the entire system. Also, when the pulley 1 together with the power source has come to a stop, or when the rotation of the rotation shaft 6 is momentarily reversed, for example, due to a reverse component included in the transmitted rotational power by variation of rotation in the power source, the one-way clutch section 53 becomes disengaged so as to block the transmission of the reverse component to the compressor 8.

Thus, substantially the same operative effect can be obtained with the compressor 8 of the fourth embodiment, as with that of the above-described third embodiment. In addition, in the construction specific to the compressor 8 of the fourth embodiment, the one-way clutch unit 5 is provided as a built-in unit inside the housing of the compressor 8 and, therefore, it has the advantage that the lubrication of the one-way clutch unit 5 can be carried out using a part of the lubricant oil circulating in the compressor 8. Thus, the compressor of the fourth embodiment eliminates the need of grease lubrication for the one-way clutch unit 5, and can advantageously avoid the problems such as wear or overheating.

What is claimed is:

1. A compressor provided with a torque limiter, the compressor being additionally provided with a power transmission mechanism and rotationally driven by an external rotational power source via said power transmission mechanism, characterized in that said power transmission mechanism comprises a one-way clutch section and, while the torque load acting upon said compressor is within the range of normal value, said one-way clutch section is in engagement so as to transmit the rotational power from said rotational power source to said compressor whereas, when the torque load acting upon said compressor increases unusually above a predetermined value, said one-way clutch section becomes disengaged so that the transmission of the rotational power from said rotational power source to said compressor is shut off, and the rotational power is not transmitted again once the transmission of the rotational power is shut off, wherein said one-way clutch section is composed of a roller type one-way clutch and, in addition to a first pocket section being formed on one side, in the circumferential direction, of a wedge surface to be engaged with said roller of the one-way clutch section on the outer ring or the inner ring, a second pocket section is formed on the other side of the wedge surface such that, when the torque load increases unusually above a predetermined value, said roller falls into the second pocket section to be disengaged from said wedge surface, and a distance between the outer ring and the inner ring in the second pocket section is larger than that between the outer ring and the inner ring at the wedge surface and is larger than the diameter of the roller.

2. A compressor provided with a torque limiter according to claim 1, wherein a built-in auxiliary power source is provided in the interior or in the vicinity of said power transmission mechanism and is capable of rotationally driving said compressor in place of said rotational power source, and wherein said one-way clutch section is capable of maintaining said rotational power source in a halted state.

3. A compressor provided with a torque limiter according to claim 2, wherein said auxiliary power source is an electric motor.

4. A compressor provided with a torque limiter according to claim 1, wherein a shock-absorbing damper formed of elastic material is provided in the power transmission path.

5. A compressor provided with a torque limiter according to claim 4, wherein said shock-absorbing damper constitutes a seal mechanism for blocking the ingress of foreign substance.

6. A compressor provided with a torque limiter according to claim 1, wherein most of said power transmission mechanism is constructed in the inside of a pulley for receiving the rotational power from said rotational power source.

7. A compressor provided with a torque limiter according to claim 1, wherein a bearing section is provided in conjunction with said one-way clutch section for maintaining the concentricity of the outer ring and the inner ring thereof.

8. A compressor provided with a torque limiter according to claim 1, wherein said one-way clutch section is provided outside the housing of the compressor.

9. A compressor provided with a torque limiter according to claim 1, wherein said one-way clutch section is provided in the inside of the housing of the compressor.

10. A compressor comprising:
a torque limiter; and
a power transmission mechanism, wherein the compressor is rotationally driven by an external rotational power source via the power transmission mechanism, wherein the power transmission mechanism includes a one-way clutch and, while a torque load acting upon the compressor is within a normal range, the one-way clutch is engaged and transmits rotational power from the rotational power source to the compressor and, when the torque load acting upon the compressor increases above a predetermined value, the one-way clutch becomes disengaged and disabled, wherein the one-way clutch is a roller-type one-way clutch and comprises:
an outer ring;
an inner ring;
a roller;
a wedge surface that engages the roller, wherein the wedge surface is formed on the outer ring or the inner ring, and engagement between the roller and the wedge surface causes engagement of the clutch;
a first pocket section formed on one side of the wedge surface;
a second pocket section formed on the other side of the wedge surface, in the circumferential direction, such that, when the torque load is abnormally above a predetermined value, the roller enters the second pocket section and is disengaged from the wedge surface, wherein a distance between the outer ring and the inner ring in the second pocket section is larger than that between the outer ring and the inner ring at the wedge surface and is larger than the diameter of the roller.

11. A compressor provided with a torque limiter according to claim 10, wherein the compressor includes a built-in auxiliary power source in the interior of the power transmission mechanism or in the vicinity of the power transmission mechanism, and the auxiliary power source is capable of rotationally driving the compressor.

12. A compressor provided with a torque limiter according to claim 11, wherein the auxiliary power source is an electric motor.

13. A compressor provided with a torque limiter according to claim 10, wherein a shock-absorbing damper formed of elastic material is provided in the power transmission path.

14. A compressor provided with a torque limiter according to claim 10, wherein most of the power transmission mechanism is located inside a pulley for receiving the rotational power from the rotational power source.

15. A compressor provided with a torque limiter according to claim 10, wherein the one-way clutch is located outside of the housing of the compressor.

16. A compressor provided with a torque limiter according to claim 10, wherein the one-way clutch is located within the housing of the compressor.

17. A compressor provided with a torque limiter according to claim 10, wherein the wedge surface is tilted in the forward direction with respect to the rotational drive direction.

18. A compressor provided with a torque limiter according to claim 16, wherein the roller is positioned at a side of the wedge surface at which the first pocket section is located before the roller enters the second pocket section, and the one-way clutch section comprises springs for pushing the respective rollers in the direction opposite to the rotational drive direction of the compressor.

* * * * *